April 19, 1927.

J. K. OLSEN

MAGNETIC SPEEDOMETER

Filed July 12, 1922

Inventor:
John K. Olsen,
by Burton Burton
his Attys.

April 19, 1927.

J. K. OLSEN 1,625,142

MAGNETIC SPEEDOMETER

Filed July 12, 1922

Patented Apr. 19, 1927.

1,625,142

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

MAGNETIC SPEEDOMETER.

Application filed July 12, 1922. Serial No. 574,522.

The purpose of this invention is to provide a speedometer of the magnetic type, adapted with a given weight of magnet and a given speed of rotation to produce a stronger drag effect upon the drag and indicating element and to be more economical in construction than the magnetic speedometers in common use. It consists in the elements and features of construction shown and described as indicated in the claims.

In the drawings:—

Figure 4 is a section at the line, 4—4, on Figure 2.

Figure 5 is a section at the line, 5—5, on Figure 2.

Figure 7 is a perspective view of the drag-dial cup member broken at the corner for showing its sectional form.

Figure 8 is a detail section at the line 8—8 on Figure 4.

Figure 1:
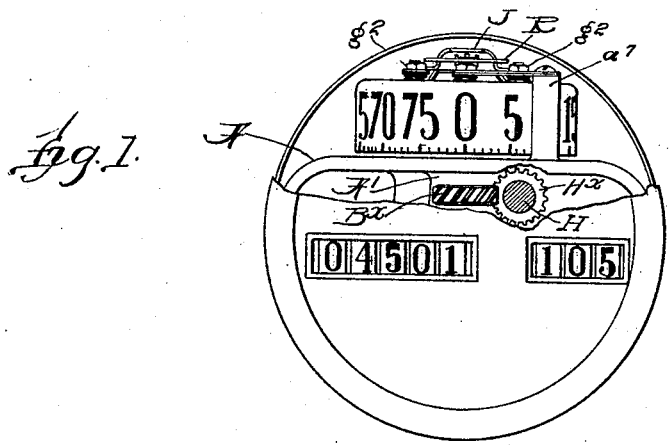
Figure 1 is a face view of an instrument comprising a speedometer mechanism, the face plate of the instrument being broken away to disclose the speedometer element.

The drawings show a frame or supporting member, A, which in the combined instrument comprising this speedometer is the supporting member also for the odometer mechanism, not shown herein. Of this frame member, $A^1$, is the journal bearing for the rotating magnet, B, whose carrying shaft, $B^1$, is journaled vertically in said bearing, the means of rotation, not particularly concerned in this invention, being indicated by the intermeshing gears, $H^x$ and $B^x$, $H^x$ being on the driving shaft, H, and $B^x$ being on the magnet shaft. The magnet shaft, $B^1$, is axially hollow for permitting the shaft or spindle, $f$, of the drag element, F, to extend through it, said spindle being afforded a step bearing in the jewel, $a^{10}$, mounted in the jewel holder, $A^{12}$, which is screwed into the lower end of said journal bearing, $A^1$. The upper bearing of the spindle, $f$, is obtained at $g$ at the center of the field plate which is formed and mounted as hereinafter described.

For affording means for carrying the field plate, the frame, A, has posts, $a^6$, $a^7$, upstanding parallel to the axis of the magnet; and upon the upper end of these posts, there are formed seats on which respectively, there are secured rigidly by one end, bi-metallic bars, $A^{10}$, $A^{10}$, $A^{10}$, which project inwardly over the magnet, drag element and field plate, so as to terminate overhanging three points equally spaced apart in a circle about the axis of the magnet, outside the area occupied by the biasing spring, R. From the overhanging ends of these bi-metallic bars the field plate, G, is suspended by means of threaded studs, $g^1$, projecting upward through apertures in the ends of said bi-metallic bars, $A^{10}$, provided with nuts, $g^2$, above said bars, a spring, $k$, being coiled around the studs between the field plate and the bi-metallic bars for yieldingly and adjustably spacing the field plate downwardly from the overhanging ends of the bi-metallic bars.

The same post, $a^6$, which carries two of the bi-metallic bars, $A^{10}$, serves for carrying also a check bar, J, made in T form with the cross of the T secured at its end by the two screws, $h$, which secure the bi-metallic bars, $A^{10}$, to the posts, $a^6$. The free end of said check finger overhanging the upper end of the drag disk spindle, $f$, checks it and the drag disk against vertical movement without exerting any pressure on said spindle which might increase its friction in its step bearings.

The rotating magnet, B, is of the split ring form, the ring being relatively wide and thin, as may be seen most clearly in Figures 4 and 5; and thereby with a given weight of magnet, there is obtained, not only a relatively large area of flux to be intercepted by the drag disk, but also a relatively long radius and consequently relatively high velocity at the circumference at which the flux deflected by the field plate is cut by the flange of the drag disk, for the drag effect by means of which the speed indication is obtained.

For further increasing the drag by increasing the proportion of the flux deflected by the field plate and passing through the field plate in a zone at the circumference of the magnet and causing it to be cut at said zone by a relatively large cross section of the drag element, said drag element is formed as seen in Figures 4 and 7 with a depressed annular portion, $F^2$ producing an annular hollow boss $F^4$ upstanding from the horizontal web of the drag disk at the circumference, whose outer side merges in a depending flange, $F^1$, and causing a cylindrical web at $F^3$, to overhang the circumference of the magnet, spaced inwardly from the flange, $F^1$, by only the same distance by which said flange is spaced outwardly from the magnet's circumference. To co-operate with this formation of the drag disk, the field plate is peripherally flanged as seen at $G^1$, said plane being parallel and just inward from the annular cylindrical web, $F^3$, of the drag disk. Upon considering that the flux normally crossing the magnet gap, and the stray flux will be deflected out of its normal path by the peripheral portion of the field plate including said flange, $G^1$, it may be understood that the path of the flux due to this deflection from its normal course may be approximately represented by the dotted line, area X, in Figure 4; from which it will be seen that the dishing of the web of the drag disk, and similar dishing of the field plate as described, operates to increase very considerably the cross-sectional area of the drag disk which is cut by the flux or which cuts the lines of flow of flux, the increase over the form of drag disk without this hollow boss, $F^4$, and form of field plate without the up-turned flange, $G^1$, in respect to the area of drag element, having radius averaging that of the outer circumference of the magnet which cuts the lines of flow of the flux, being that which can be seen by comparing the area of the entire bead—top and sides—with the horizontal area which it occupies. The resultant large increase in the efficiency of the magnet for dragging the disk, makes it possible to employ a stronger biasing spring, and diminishes the sensitiveness of the instrument to influences not related to the speed to be recorded or indicated.

It will be observed also that this dishing or cupping of the disk of the drag element and similar formation of the field plate tends to stiffen both of these members very materially, making it possible to employ a lighter field plate than would otherwise be necessary, and rendering the drag element much less liable to accidental distortion, which tends to defeat the accuracy of its response to the speed.

Figure 2:
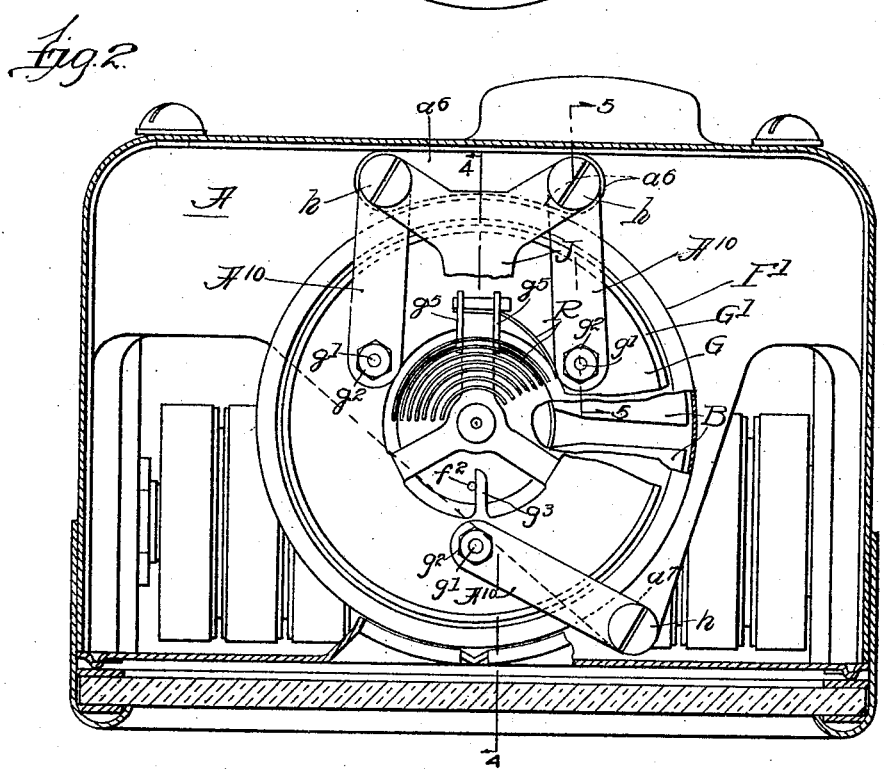
Figure 2 is a top plan view with the casing broken away.
Figure 6:
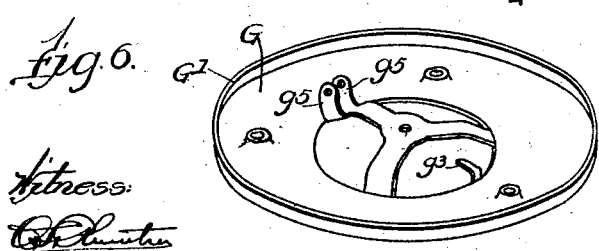
Figure 6 is a perspective view of the field plate.
Figure 3:
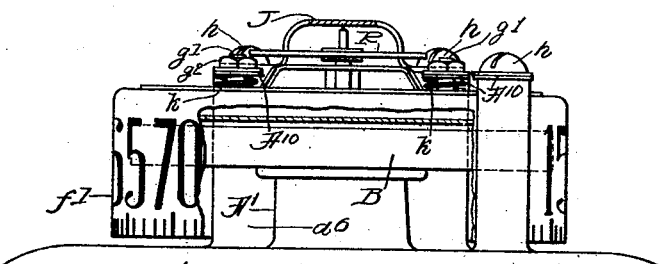
Figure 3 is a front elevation of parts shown in Figure 2 with the graduated flange or dial member of the drag element partly broken away.

The field plate is apertured around its center to form a tripod or three-armed spider, being struck up from the general plane of the plate for stiffening it. Out of two of the apertures there are folded up so as to stand in planes at right angles to the plane of the plate, lugs, $g^5$, $g^5$, which serve to secure the outer end of the biasing spring at two points, as necessary for the fixedness of said securement, as may be most clearly seen in Figure 2. For checking the drag disk in its oscillation there is struck up out of the third aperture in the field plate a check finger, $g^3$, with which the check finger, $f^2$, of the drag disk collides at the zero position of the drag disk.

It will be understood that the mounting of the field plate by suspending it from the free ends of the bi-metallic bars as described, has the purpose and effect of causing the field plate to be advanced toward and retracted from the magnet by change of the temperature causing the flexure of the supporting bars, $A^{10}$; and that to compensate for changes of drag effect due to changes of temperature, the field plate should be withdrawn from the magnet as the temperature falls, and advanced toward it as the temperature rises; and that for this purpose the metallic element of the bars, $A^{10}$, which has the higher coefficient of expansion will be the outer bar, that is, the one remote from the field plate. It will also be understood that the purpose of suspending the field plate from the bi-metallic bars by means of bolts and said interposed springs as described, is to permit adjustment of the field plate toward and from the magnet by screwing the nuts onto the bolts more or less, compressing the springs more or less; and it will also be understood that this adjustment is the means of calibrating the instrument in its original construction or assemblage.

The magnet, B, is mounted upon the rotating shaft, $B^1$, by means of the sheet metal stamping, C, which is formed to constitute a chamber, $C^1$, preferably closed by an annular cover, $c^2$. This chamber, $C^1$, is designed as a lubricant chamber from which the lubricant is delivered to the magnet shaft journal bearing through small ports, $c^1$, leading from the inner corner of its bottom, as may be seen in Figure 4. The lubricant passing thus through the vertical journal bearing and flowing through the upper portion thereof, accumulates in the secondary lubricant chamber, $b^4$, and eventually passing through the lower portion of the journal bearing, flows out or is thrown out by centrifugal force over the top of the gear, $B^x$, to the intermesh of said gear with its driving means.

It is advisable to interpose at the upper and lower ends of the bearing support, A, for taking the thrust in axial direction, non-magnetic washers which may be of textile material. Such washers are shown at $A^{11}$ and $A^{13}$ on Figure 4.

I claim:—

1. In a magnetic speedometer in combination with a rotating magnetic element, a field member extending transaxially with respect to the rotating magnet, and a drag element comprising a web interposed laterally with respect to the magnet between the same and the field member, the drag element being dished to form a two-ply bead opposite a circumferential marginal portion of the magnet, the field member being intruded into the depression formed within and encompassed by the bead whereby the cross-section of the drag element at the zone into which magnetic flux is deflected, is increased.

2. In the construction defined in claim 1, the field member being thin sheet metal flanged away from the magnet at its circumference proximate to the two-ply bead of the drag element.

3. In a magnetic speedometer, in combination with a rotating magnetic element, a field member positioned for concentrating the flux in a plane transverse to the plane of rotation of the magnet, and a drag element interposed laterally with respect to the magnet between the same and the field member, the drag element and the field member being concentrically flanged laterally opposite the circumferential margin of the magnet and away from the magnet, the drag element having its flange reflexed to extend past the circumferential periphery of the magnet and render the portion laterally opposite the magnet two-ply, for increasing the cross-section of the drag element at a zone of maximum radius into which the magnetic flux is deflected by the field plate.

4. In a magnetic speedometer a rotary ring-shaped magnet, a mount by which it is carried; a spindle for the mount at whose upper end the mount is located; a journal bearing for the spindle; a driven gear on the spindle at the lower end thereof and of said bearing, and a driving gear meshing with said driven gear, the magnet having a lubricant chamber within the inner circumference of the magnet ring with flow apertures leading to the upper end of the spindle journal bearing; whereby lubricant is supplied from said chamber to said journal bearing and thence over the surface of the gear at the lower end thereof to the intermesh of the two gears.

5. In a magnetic speedometer which comprises in combination with a frame structure a rotary magnet, a fixed laterally-positioned field plate, and an oscillating drag element co-axial with the magnet; a stop-bar for the upper end of the drag spindle, and bimetallic bars for supporting the field plate; the frame having abutments affording seats of lodgement and support spaced apart around the magnet, field plate and drag elements, the bimetallic bars being secured each at one end to said seats respectively, the spindle-stopping bar being carried by securement upon one of said seats by the same means which secures the bimetallic bar or bars thereon.

6. In the construction defined in claim 5, the spindle-stopping bar being T-shaped with the cross of the T spanning the distance between two of said seats for lapping upon both of them, for securement by the same means which secures the two bimetallic bars upon two abutments respectively.

In testimony whereof, I have hereunto set my hand at Chicago, Illinois, this 5th day of July, 1922.

JOHN K. OLSEN.